United States Patent
Sutton

(10) Patent No.: US 6,796,393 B2
(45) Date of Patent: Sep. 28, 2004

(54) HOOD LOCATING ISOLATOR

(75) Inventor: Anthony D. Sutton, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/178,382

(22) Filed: Jun. 24, 2002

(65) Prior Publication Data

US 2003/0234125 A1 Dec. 25, 2003

(51) Int. Cl.[7] .................................................. B62D 25/12
(52) U.S. Cl. ............... 180/69.2; 180/69.23; 267/140.11
(58) Field of Search ........................... 180/69.2, 69.21, 180/69.22, 69.23; 16/225, 277, 335, DIG. 43; 267/140.11, 141; 224/459, 462, 555; 248/638, 674

(56) References Cited

U.S. PATENT DOCUMENTS

| | | | | |
|---|---|---|---|---|
| 3,069,720 A | * | 12/1962 | Gessler | 16/306 |
| 4,097,958 A | * | 7/1978 | Van Dell | 16/225 |
| 4,416,446 A | * | 11/1983 | Murakami | 267/140.3 |
| 5,092,017 A | * | 3/1992 | Hatano et al. | 16/277 |
| 5,718,019 A | * | 2/1998 | Cheal | 16/388 |
| 5,826,672 A | * | 10/1998 | Holter et al. | 180/69.21 |
| 5,890,556 A | * | 4/1999 | Shearn et al. | 180/69.21 |
| 6,361,030 B1 | * | 3/2002 | Rogge et al. | 267/140.13 |
| 6,394,211 B1 | * | 5/2002 | Palenchar et al. | 180/69.21 |

* cited by examiner

*Primary Examiner*—Bryan Fischmann
*Assistant Examiner*—Christopher Bottorff
(74) *Attorney, Agent, or Firm*—Jeffrey P. Calfa; Dennis Kelly Sullivan; Susan L. Lukasik

(57) ABSTRACT

A hood isolator designed for a motor vehicle allows tighter clearances between the hood and cab mounting brackets of a motor vehicle while reducing stress on the hood front hood hinge. The hood isolator comprises a bracket with a mounting plate, a front plate and an intermediate plate therebetween. A receptor cup is located at least partially within the bracket. The receptor cup has a wall and an opening at one end. A connector extends from the receptor cup wall to the inside of the bracket and is preferably compressed between the wall and the bracket. An isolator arm has a head at one end and an opposite distal end. The head fits at least partially within the receptor cup through the opening. The isolator arm mounts to the vehicle opposite the head, while the bracket preferably mounts to hood with the mounting plate.

18 Claims, 2 Drawing Sheets

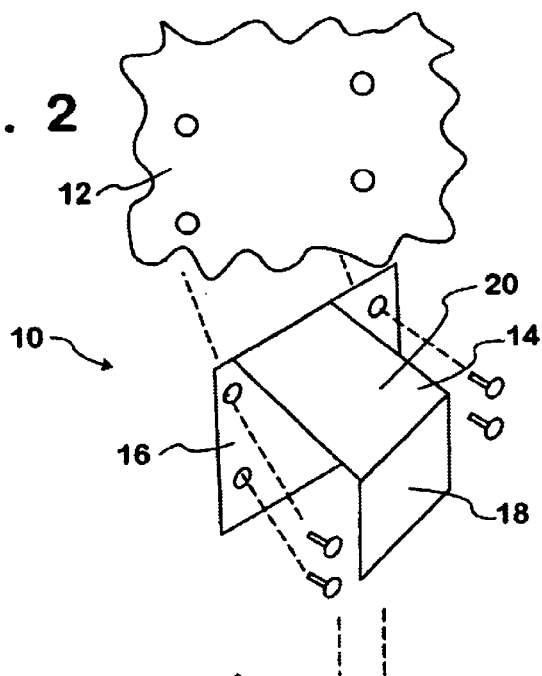
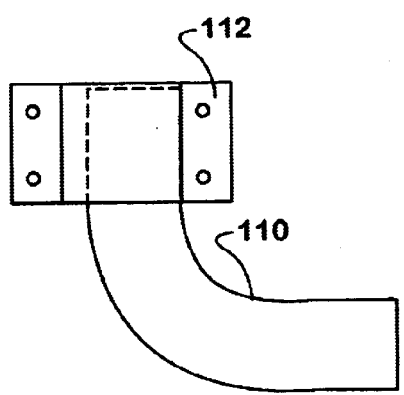
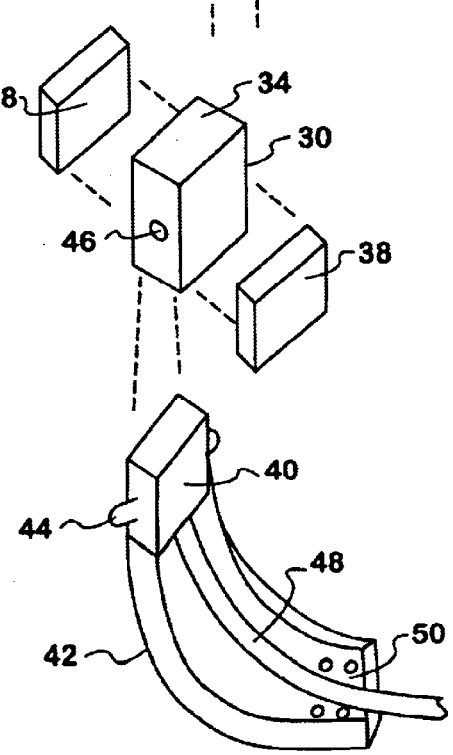
FIG. 2
FIG. 1
PRIOR ART

HOOD LOCATING ISOLATOR

BACKGROUND OF THE INVENTION

1. Field of the Invention

The present invention relates to a hood isolator for motor vehicles.

2. Description of the Prior Art

Large motor vehicles, such as semitractors and trucks, have large, bulky and heavy hoods attached to their cabs. The hoods are typically fastened at the front of the chassis using a front hood hinge. In many designs, the bulky hood opens to a vertical position by pivoting on the front hood hinge. The front hood hinge must therefore support the weight of the heavy hood in the open position.

At the back of the hood, the hood mounts to the cab using brackets. The brackets preferably engage each other closely, allowing a minimal clearance or tight interface between the hood and cab brackets. This tight interface reduces annoying noises, such as squeaks, buzzes and rattles during movement between the hood and cab.

During movement, the front of the hood and the front hood hinge are under stress. Cab movement in the vertical or fore and aft directions stresses the hood. The tight interface between the hood and cab brackets increases the stress by transmitting energy from the cab to the large hood and the front hood hinge as the cab moves. Constant stress on the front hood and front hood hinge can increase metal fatigue and possibly lead to a dangerous failure of the hinge when the hood is opened.

One prior art method reduces the stress by strengthening or heavily reinforcing the hood. The extra weight increases the stiffness of the hood and helps dampen some of the stress during movement. Unfortunately, the heavier hood is more expensive to make and the extra weight increases the cost of running the truck by increasing fuel consumption.

This method also forces more stress into the front hood hinge. To reduce the hood hinge stress, the front pivot points are made from an elastomer. This method works but adds a lot of weight, cost and size to the hinge, which makes the front hood hinge more difficult to package and blocks more cooling air from the radiators.

Other methods isolate the noises and hood by mounting the hood to the frame rather than the cab. While this method isolates the hood, it does not hold the hood in relation to the cab. The hood, therefore, is tied to the frame and is more difficult to align to the cab during assembly.

Another method uses an arm 110 inserted within a bracket 112. (FIG. 1) Arm 112 attaches to the cab, while bracket 112 attaches to the hood. This method allows some isolation of the stress on the hood as the cab travels rearward. The apparatus, however, absorbs little energy transmitted from the cab to the hood. Rather, the isolator apparatus is a conduit for transmitting the energy to the bracket and subsequently down the hood to the front and the hood hinge.

This method also requires the arm to fit tightly within the bracket on the forward side. If the head is loose within the bracket, the head can bang against the bracket during motor vehicle movement. As the arm and bracket are usually metal or hard plastic, this banging increases the wear and tear of the head and bracket. Not only is stress from the cab still radiating to the front of the hood and front hood hinge, the bracket and arm themselves are under heavy stress as well.

An additional method loosely attaches the hood to the cab. This method allows little hood to cab alignment as well as frequent bangs and squeaks to occur.

Therefore, it is one object of the invention to reduce or isolate the stress on the hood from the cab during movement. Another object of the invention is to tightly hold the isolator arm within a bracket to prevent shifting or movement of the isolator arm within the bracket. Still another object of the invention is to reduce annoying noises, such as buzzes, squeaks and rattles. A further object of the invention is to produce an apparatus that is easy to assemble and align the hood to the cab.

SUMMARY OF THE INVENTION

According to the invention there is provided a hood isolator designed for a motor vehicle, especially a heavy truck. The hood isolator allows a minimal clearance between the hood mounting means and the cab mounting means while reducing the stress on the hood during cab movement, especially the stress on the front of the hood and front hood hinge. The hood isolator comprises a bracket with a mounting plate, a front plate and an intermediate plate therebetween. The three plates have first and second sides. A receptor cup with a wall and an opening at one end is located at least partially within the bracket. A connector extends from the receptor cup wall to the first side of the bracket.

An isolator arm has a head and a distal end opposite the head. The head fits at least partially within the receptor cup through the opening. The isolator arm mounts to the vehicle at the distal end, while the bracket preferably mounts to hood with the mounting plate.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a prior art hood isolator in a front plan view with an isolator arm head in phantom;

FIG. 2 is an exploded perspective view of the hood isolator of the invention;

DETAILED DESCRIPTION OF THE INVENTION

Figure 3:
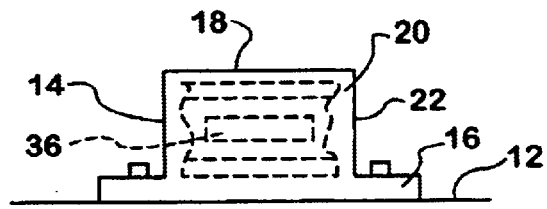
FIG. 3 is a top plan view of the bracket and receptor cup of the hood isolator of the invention with the receptor cup in phantom.
Figure 4:
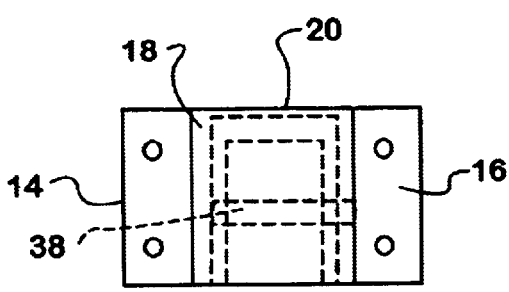
FIG. 4 is a side plan view of the bracket and receptor cup of the hood isolator of the invention with the receptor cup and connector in phantom.

The invention relates to a hood isolator 10 for a motor vehicle, especially for semitractors and trucks. Turning to the figures where like reference numerals refer to like structures, in FIG. 2 bracket 14 mounts to the interior of hood 12 of a motor vehicle. Bracket 14 mounts to hood 12 using mounting plate 16 and any mounting means known in the art, such as bolting, screwing, welding, chemical bonding, and the like.

As shown in the Figures, bracket 14 has mounting plate 16, intermediate plate 20 adjacent to front plate 18. The plates define first 24 and second 25 sides of bracket 14, with first side 24 located inside of bracket 14. If desired, enclosure 26 can form by closing one end of bracket 14 with end plate 22.

Receptor cup 28 is located at least partially within enclosure 26 of bracket 14. Receptor cup 28 has wall 30 and opening 32 at one end. Preferably, receptor cup 28 is closed at one end opposite opening 32 by end wall 34 to form head-receiving chamber 36.

Figure 6:
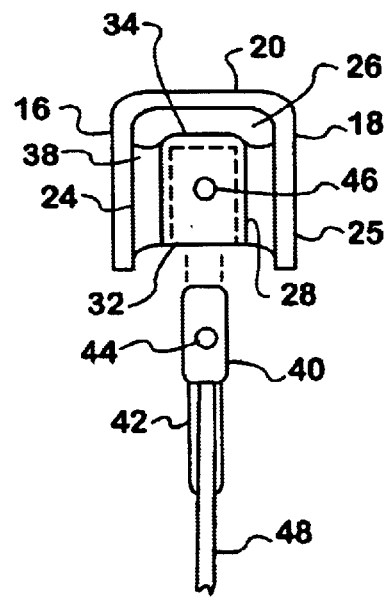
FIG. 6 is a front plan view of the hood isolator of the invention.
Figure 5:
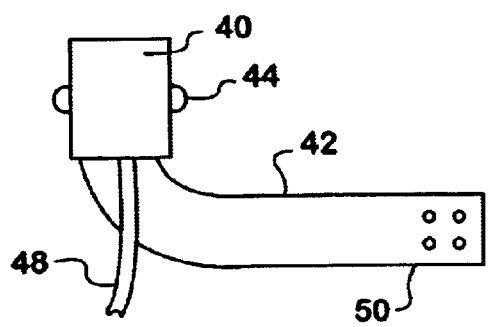
FIG. 5 is a side plan view of the isolator arm of the hood isolator of the invention.

Connector 38 extends from the exterior side of wall 30 to first side 24 of bracket 14. Preferably connectors 38 extend between wall 30 and first side 24 of front plate 18 and mounting plate 16. Connector 38 can be a rectangular extension from the exterior side of wall 30 of receptor cup 28 prior to assembly within bracket 14 (FIG. 2). As shown in FIG. 6 after assembly into bracket 14, connector 38 is preferably compressed between receptor cup 28 and bracket 14. Receptor cup 28 and connector 38 are affixed to bracket 14, preferably by bonding.

Isolator arm 42 has head 40 and distal end 50 opposite head 40. Head 40 of isolator arm 42 fits through opening 32 and into at least part of head receiving chamber 36 of receptor cup 28. Head 40 should engage the interior of wall 30.

Preferably, locking means prevent head 40 from jarring loose within receptor cup 28 during motor vehicle movement. Locking means include any methods used in the art. One such method includes pins 44 extending outwardly from head 40 to engage bores 46 or indentations within wall 30. If desired, an eyelet, grommet, and the like can be inserted into bore 46 for receiving pin 44. For easier insertion and removal of head 40 within receptor cup 28, pins 44 can retract with electrical and/or mechanical retracting means, such as through the use of cable 48 activating a spring loaded pin and locking mechanism. Likewise, pins 44 can retract by manually pushing pins 44 into head 40 and pulling head 40 out of receptor cup 28. If a manual means is used, the pins should be accessible while head 40 and receptor cup 38 are within bracket 14. Another method includes frictionally fitting head 40 against wall 30 of receptor cup 28. Another method includes inserting a pin, bolt, and the like through bores in head 40, receptor cup 28, and locking the pin or bolt with a nut.

Like the mounting means for bracket 14, isolator arm 42 attaches to the motor vehicle at distal end 50 using any means know in the art, such as bolting, screwing, welding, chemical bonding, and the like. While isolator arm 42 can attach to the motor vehicle's frame, isolator arm 42 preferably attach to the cab. Likewise, isolator arm 42 can attach to hood 12 while bracket 14 mounts to the cab or frame.

The connector should isolate the bracket and hood from movement of the cab during motor vehicle movement. The connector and the receptor cup should therefore absorb at least some of the energy transmitted from the cab or frame to the hood through the isolator arm. To absorb this energy, the connector should be oriented in compression in a first, preferably lateral direction, and in shear in the second and third directions, preferably the vertical and the fore and aft directions. More specifically when the connector is compressed within the bracket, the compressed connector should reduce lateral or side-to-side movement which can cause the bracket to flap from side to side. Yet, the compressed connector in shear allows weak movement in the vertical as well as the fore and aft directions. The connector, therefore can be made from a compressible material, such as a resilient plastic. Preferably the compressible material is an elastomer, more preferably a rubber, most preferably a cured or vulcanized rubber. If desired, the receptor cup and the head are preferably made from hard materials, such as a hard metal like steel. The receptor cup and the connector are preferably affixed together by bonding, more preferably by adhesive bonding such as through molding or secondary bonding with heat.

The receptor cup and connector of the hood isolator of the invention prevent the head from banging against the bracket during movement. This decreases wear and tear on the head and bracket during use. This lack of movement between the bracket and the isolator arm should reduce the annoying buzzes, squeaks and rattles during hood to cab movement.

The use of the isolator apparatus also absorbs some of the energy transmitted from the cab during movement which decreases the force transmitted to the front of the hood and the hood hinge. This would reduce the stress on the hinge metal that can cause metal fatigue and failure and increase the life span of to the hinge.

The isolator apparatus is also easy to assemble and align with the cab, therefore decreasing assembly time of the vehicle.

While the invention is shown in only one of its forms, it is not thus limited but is susceptible to various changes and modifications without departing from the spirit and scope of the invention.

What is claimed is:

1. A hood isolator for a motor vehicle comprising:
    a bracket having a mounting plate, a front plate and an intermediate plate therebetween, the bracket having first and second sides;
    a receptor cup having a wall and an opening at one end, the receptor cup being located at least partially within the bracket;
    a connector extending from the wall to the first side of the bracket;
    an isolator arm having a head and a distal end opposite the head, the head being designed to fit at least partially within the receptor cup through the opening; and
    a locking device to lock the head within the receptor cup.

2. A hood isolator for a motor vehicle of claim 1, wherein the locking device further comprises:
    a pin extending from the head and matingly engaging the wall.

3. A hood isolator for a motor vehicle of claim 2, wherein the locking device further comprises:
    a bore within the wall; and
    wherein the pin matingly engages the wall through the bore.

4. A hood isolator for a motor vehicle of claim 1, wherein the connector is compressed between the wall and the first side of the bracket.

5. A hood isolator for a motor vehicle of claim 4, wherein the locking device further comprises:
    a spring loaded pin in the head; and
    wherein the pin matingly engages the wall when in an extended position.

6. A hood isolator for a motor vehicle of claim 4, wherein the connector is compressed in a first direction and in shear in second and third directions.

7. A hood Isolator for a motor vehicle of claim 4, wherein the connector can move weakly in vertical and fore and aft directions, and lateral movement of the bracket is reduced.

8. A hood isolator for a motor vehicle having a hood, the hood isolator comprising:
- a bracket mounted to one aide of the hood, the bracket having a front plate opposite the hood and an intermediate plate adjacent the front plate, the bracket having first and second sides;
- a receptor cup having a wall and an opening at one end;
- a connector extending form the wall of the receptor cup to the first side of the bracket;
- an isolator arm having a head and a distal end opposite the head, the head being designed to fit at least partially within the receptor cup through the opening;
- wherein the isolator arm is attached to the motor vehicle; and
- a locking device to lock the head within the receptor cup.

9. A hood isolator for a motor vehicle having a hood of claim 8, wherein the locking device further comprises:
- a pin extending from the head and matingly engaging the wall.

10. A hood isolator for a motor vehicle having a hood of claim 9, wherein the locking device further comprises:
- a bore within the wall; and
- wherein the pin matingly engages the wall through the bore.

11. A hood isolator for a motor vehicle having a hood of claim 8, wherein the connector is compressed between the wall and the first side of the bracket.

12. A hood isolator for a motor vehicle having a hood of claim 11, wherein the locking device further comprises:
- a spring loaded pin in the head; and
- wherein the pin matingly engages the wall when in an extended position.

13. A hood isolator for a motor vehicle having a hood of claim 11, wherein the connector is compressed in a first direction and in shear in second and third directions.

14. A hood isolator for a motor vehicle having a hood of claim 11, wherein the connector can move weakly in vertical and fore and aft directions, and lateral movement of the bracket is reduced.

15. An apparatus for a hood isolator for a motor vehicle, comprising:
- a bracket having a mounting plate, a front plate, and an intermediate plate therebetween, the bracket having first and second sides;
- a receptor cup having a wall defining a head-receiving chamber, the chamber having an opening at one end and an end wall opposite the opening, and the receptor cup being located at least partially within the bracket; and
- a connector extending from the wall to the first side of the bracket and being compressed between the wall and the first side of the bracket.

16. An apparatus for a hood isolator for a motor vehicle of claim 15, wherein the receptor cup further comprises:
- a bore within the wall.

17. An apparatus for a hood isolator for a motor vehicle of claim 15, wherein the connector is compressed in a first direction and in shear in second and third directions.

18. An apparatus for a hood isolator for a motor vehicle of claim 15, wherein the connector can move weakly in vertical and fore and aft directions, and lateral movement of the bracket is reduced.

* * * * *